W. D. LUTZ.
ALTERNATING CURRENT MAGNET BRAKE.
APPLICATION FILED MAR. 15, 1913.
1,221,880.
Patented Apr. 10, 1917.
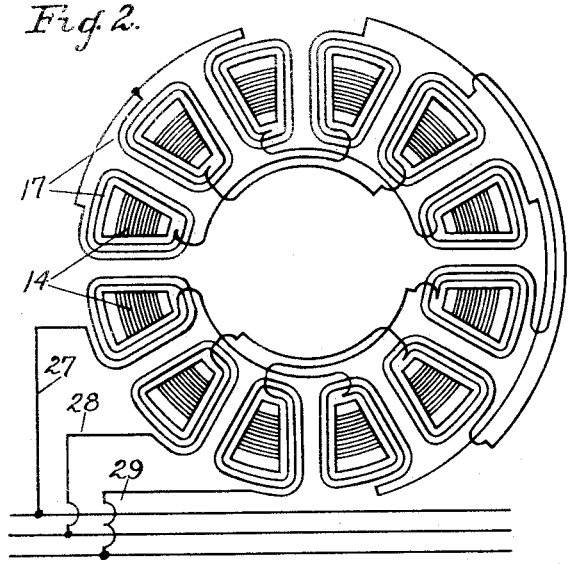
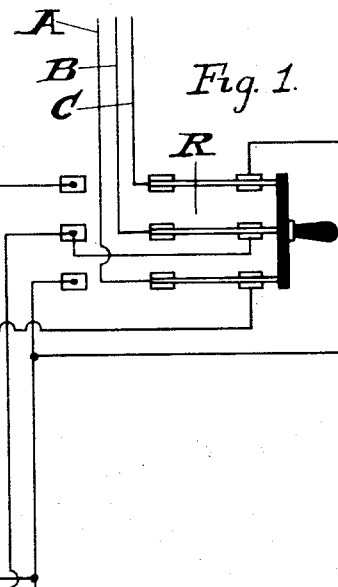
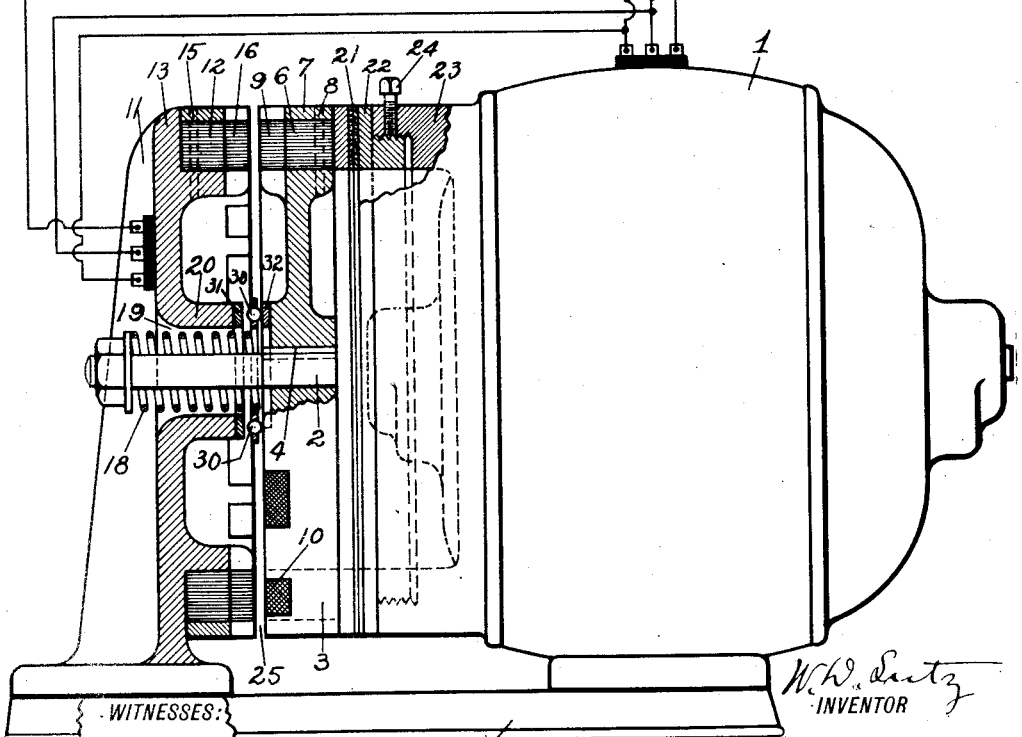

UNITED STATES PATENT OFFICE.

WILLIAM D. LUTZ, OF ALLENDALE, NEW JERSEY, ASSIGNOR TO OTIS ELEVATOR COMPANY, OF JERSEY CITY, NEW JERSEY, A CORPORATION OF NEW JERSEY.

ALTERNATING-CURRENT MAGNET-BRAKE.

1,221,880.   Specification of Letters Patent.   Patented Apr. 10, 1917.

Application filed March 15, 1913. Serial No. 754,464.

*To all whom it may concern:*

Be it known that I, WILLIAM D. LUTZ, a citizen of the United States, residing in Allendale, in the county of Bergen and State of New Jersey, have invented a new and useful Improvement in Alternating-Current Magnet-Brakes, of which the following is a specification.

My invention relates to improvements in alternating current brake apparatus, and has for one of its objects the provision of means having novel features of construction and arrangement of parts, wherein the danger due to residual magnetism which causes sticking of the operating parts is entirely eliminated.

Another object of the invention is the provision of means which are efficient and positive in operation, and in which, when receiving an electric current, the action of the magnet is not of a violent character, and therefore the noise which is common to the ordinary type of alternating current brake mechanism is eliminated.

Still another object of the invention is to provide a brake of the character described in which the mechanism is adjustable to operate with extremely small clearances.

Other objects of the invention will appear hereinafter, the novel combinations of elements being pointed out in the appended claims.

Referring to the drawings, Figure 1 is a part section elevational view of my invention as applied to an alternating current motor, and also a system of electrical circuits therefor; Fig. 2 is a diagrammatic representation of a stator and connections for the windings therefor comprising the invention.

In Fig. 1, I have shown my brake apparatus applied to an alternating current induction motor 1, which may be any of the well known types, whose rotor shaft 2 is extended to carry a supplementary rotor or armature 3. The latter is free to move in a longitudinal direction on the rotor shaft 2, and is keyed thereto by a feather 4.

The armature 3 comprises a plurality of poles, each of which comprises laminations, 6, carried on a spider 7, and held thereon by dowel pins 8. The laminations have projections 9, thereon, forming poles around which windings 10 are placed and held in fixed position.

A stator 11 comprises a plurality of poles 14 (see Fig. 2), each of which comprises laminations 12, carried on a spider 13, and are held in position thereon by dowel pins 15. The laminations have projections 16 forming poles around which windings 17 are placed and held in position. The stator and motor 1 are secured to a bed plate 26, the stator being positioned thereon to present pole faces to the armature 3.

A heavy coil spring 18 is carried on the shaft 2, and a hub 20, having an opening 19, is provided in the stator, to allow for the extension of the shaft and the said spring. The latter presses the armature or rotor 3 against friction disks 21 which may be of leather or any other suitable material. The disks are suitably secured to an adjustable collar 22, which is adjustable longitudinally in the screw threaded end frame 23 of the motor 1, and is locked in position by a set screw 24.

It will thus be seen that the air gap 25 between the pole faces of the stator 11 and armature 3, may be adjusted to allow extremely small clearances between the pole faces of the stator, and the pole faces of the armature, which has a rotary as well as a longitudinal movement, and it is particularly advantageous to have the air gap as small as possible in order to minimize the current consumption of the stator.

The stator 11 has four poles Fig. 2, and its magnet windings 17 are connected in parallel with the motor 1, which has a corresponding number of poles. The relative connections of the windings of the stator 11, and the stator windings of the motor 1 are such that when both are receiving an electric current, the rotating magnetic field set up in the stator 11 will rotate in the same direction as the field flux of the motor 1.

One method of connections for the windings of the stator 11 is illustrated in Fig. 2, which constitutes a three-phase star connection, and the connections for the armature 3 are the same, but the leads 27, 28 and 29 are connected in a well known manner, so that the windings form a closed circuit. The method of connections for the motor have not been shown, as they are the same as shown in Fig. 2.

The mains A, B and C indicate conductors from a source of three phase alternating current supply, which is directed to the motor 1 and stator 11, through a reversing switch R, which is operable to reverse the direction of current through the said motor and stator in a well known manner.

With the switch R in its central or off position, the brake is applied as shown in Fig. 1. If the reversing switch is now thrown to a right hand position, the motor 1 and stator 11 will receive current. A rotating magnetic field flux will now be induced in the stator 11, and will attract the armature 3 causing the same to slide longitudinally on the shaft 2, the armature being limited in its movement by a ball bearing 30, positioned between a ring 31 on the hub 20 and a ring 32 on the spider 7. It is to be noted here, that the ball bearings keep the pole faces on the stator and armature from coming into mechanical contact with each other, thereby eliminating the violent shock and noise, as is noticeable in the ordinary type of alternating current brake magnets. The movement of the rotor 3 along the shaft 2 disengages the same from the friction disks 21 permitting the motor to rotate freely.

When the current is cut off of the motor and stator 11, that is by moving the switch to its off position, the spring 18 presses the rotor into engagement with the friction disks, and the motor is thereby brought to a quick and positive stop, and there is absolutely no possibility of the pole faces sticking, due to residual magnetism as the ball bearings limit the movement of the armature, and the pole faces are therefore kept from coming into mechanical contact with each other.

By throwing the switch to a left hand position, the current is directed through the motor and stator in a reverse direction, the brake will operate as before described, and the motor will run in a reverse direction to that which it did when the switch was thrown to the right.

It is to be noted, and will readily be seen that with an arrangement as herein shown, that when the motor 1 and stator 11 receive current, the rotating magnetic field induced in the said stator, causing a rotating field flux to pass through the armature, gives to the latter a rotary as well as a longitudinal movement, and this rotary field flux acting on the armature will tend to assist the motor in starting and driving its load. As the motor approaches synchronous speed, the stator 11 having the same number of poles as the motor, the rotating field set up in the armature will approach synchronism with the current in the windings of the stator 11, thus preventing a reversal of magnetism with its accompanying vibration in the armature 3. Reversing the phase relation of the polyphase currents supplied to the motor for the purpose of changing its direction of rotation will correspondingly reverse the direction of rotation of the field flux induced by the windings of the stator 11, so that the brake apparatus will in each instance assist the motor in starting and driving its load.

Although I have shown and described my invention in conjunction with a polyphase circuit it is to be understood that it may readily be adapted to a single phase circuit without affecting the efficiency and purposes it is proposed to accomplish. Obviously those skilled in the art may make various changes in the details of construction and arrangement of parts without departing from the spirit and scope of my invention, and I desire not to be limited to the precise construction herein disclosed.

What I claim and desire to have protected by Letters Patent of the United States is:—

1. In brake apparatus, the combination with an induction motor, a motor frame therefor having a friction collar positioned therein, an alternating current electromagnet, an armature therefor rotatable with the motor and out of engagement with the friction collar when in its attracted position, and movable to frictionally engage with the friction collar when the electromagnet is deënergized, and a spring for pressing the armature against the said friction collar.

2. In brake apparatus, the combination with an induction motor, a motor frame therefor having an end frame screw-threaded to receive a friction collar, a motor shaft, a multiphase alternating current electromagnet having windings mounted in stationary or fixed position, an armature positioned on said shaft and movable longitudinally to frictionally engage the said friction collar and thereby effect the retardation of the motor, when the current supply is cut off the motor and electromagnet windings, and movable out of engagement with the friction collar when the motor and magnet windings receive current.

3. In brake apparatus, the combination with an induction motor, a motor frame having a friction collar adjustable therein, a motor shaft, an armature keyed thereto by a feather and frictionally engaging said friction collar to effect the retardation of the motor, an alternating current electromagnet positioned to permit its pole faces to attract its armature, when the former receives an electric current, and thereby disengage the armature from the said friction collar, and means for limiting the longitudinal movement of the armature toward its attracted position.

4. In brake apparatus, the combination with an induction motor, a motor frame therefor having an end frame, a friction collar adjustable therein, a lock nut therefor, an alternating current electromagnet having its windings mounted in a stationary or fixed position, an armature therefor keyed to the said shaft and movable longitudinally thereon out of engagement with the friction collar when the magnet windings are excited, a ball bearing interposed between the electromagnet and the armature, to limit the movement of the same to its attracted position, and a spring to press the armature against the friction collar, when the magnet windings are unexcited.

5. In a brake apparatus, the combination with an induction motor, a motor frame therefor having a screw threaded end frame, a friction collar adjustable therein, a lock nut positioned in said frame and engaging said collar to hold the latter against rotation, a multiphase alternating current electromagnet comprising a stationary frame having laminated poles thereon and having windings held in fixed position thereon, a motor shaft, an armature keyed thereto and engaging said friction collar when in its unattracted position, a spring for pressing the armature against the friction collar when the windings are unexcited, a ball bearing for limiting the movement of the armature to its attracted position, and means for regulating the air gap between the armature and the said electromagnet.

6. In brake apparatus, the combination with an induction motor, a motor frame therefor having an end frame screw threaded to receive a friction collar, frictional braking means associated with the said motor comprising an alternating current electromagnet having a rotatable armature movable into frictional engagement with the friction collar when unattracted by the electromagnet, and movable out of engagement with the said friction collar when attracted by the electromagnet.

7. In brake apparatus, the combination with an induction motor, a motor frame having an end frame screw threaded to receive a friction collar, a motor shaft, a supplementary armature rotatable therewith and movable longitudinally thereon to engage the friction collar to effect the retardation of the said motor, and a stationary alternating current electromagnet positioned to attract the armature and thereby cause the latter to be moved out of engagement with the friction collar upon excitation of the said electromagnet, and a ball bearing positioned between the electromagnet and its armature to limit the longitudinal movement of the latter to its attracted position.

8. In brake apparatus, the combination with an induction motor, a motor frame extended and screw threaded to receive a friction collar, a nut for locking the same against rotation, a motor shaft, a supplementary armature rotatable therewith and movable to engage the friction collar when unattracted, a multiphase alternating current electromagnet positioned to present its pole faces to the pole faces on the armature, whereby the latter is moved longitudinally on the said shaft and out of engagement with the said friction collar, when the electromagnet receives current, a ball bearing positioned to limit the movement of the armature to its attracted position, a spring positioned on the said shaft for pressing the armature against the friction collar when the armature is unattracted, and means for adjusting the air gap between the pole faces of the electromagnet and the pole faces on the armature.

In testimony whereof, I have signed my name to this specification in the presence of two subscribing witnesses.

WILLIAM D. LUTZ.

Witnesses:
WALTER C. STRANG,
JAMES G. BETHELL.